United States Patent [19]

DiRienzo

[11] Patent Number: 4,963,634

[45] Date of Patent: Oct. 16, 1990

[54] REMOVING FINES FROM MASS RESINS OF POLYVINYLCHLORIDE

[75] Inventor: David J. DiRienzo, Baton Rouge, La.

[73] Assignee: The B. F. Goodrich Company, Brecksville, Ohio

[21] Appl. No.: 306,725

[22] Filed: Feb. 6, 1989

Related U.S. Application Data

[63] Continuation of Ser. No. 81,065, Aug. 3, 1987.

[51] Int. Cl.$^5$ .............................................. C08F 14/06
[52] U.S. Cl. ................................................... 526/344.1
[58] Field of Search .................................... 526/344.1

[56] References Cited

U.S. PATENT DOCUMENTS

| | | | |
|---|---|---|---|
| 3,522,227 | 7/1970 | Thomas | 526/344.1 |
| 3,692,718 | 9/1972 | Goldstein | 526/344.1 |
| 3,933,771 | 9/1976 | Eastman et al. | 526/194 |
| 4,029,863 | 6/1977 | Lemper | 526/88 |
| 4,198,376 | 4/1980 | Fournel et al. | 526/88 |
| 4,229,249 | 10/1980 | Felsvang et al. | 528/501 |
| 4,257,880 | 3/1981 | Jones | 209/144 |

FOREIGN PATENT DOCUMENTS 2302306 9/1976 France .
2492388 4/1982 France .

*Primary Examiner*—Christopher Henderson
*Attorney, Agent, or Firm*—Daniel J. Hudak; Joe A. Powell

[57] ABSTRACT

The utilization of an air classifier process is effective in separating out fine-sized particles (that is, particles having a size generally less than 75 microns) from a composition of mass produced polyvinyl chloride (PVC) or PVC copolymer resin thereby producing so called normal-sized mass PVC resin particles. Such resultant normal mass PVC resin (fine free) contains very little, if any residual glassy particles and can be utilized for making thermoplastic bottles and other articles requiring low residual vinyl chloride monomer. The removal of the fines also improves the bulk handling characteristics of the normal mass PVC resin. The separated fines constitute a novel blending or extender resin and hence can be utilized in association with a PVC dispersion resin to form a plastisol. The extender resin can also be utilized as a sintering resin, as a drying resin for plasticized dry blends or as an antiblocking resin for PVC compounds.

7 Claims, No Drawings

REMOVING FINES FROM MASS RESINS OF POLYVINYLCHLORIDE

CROSS-REFERENCE

This application is a continuation of application Ser. No. 07/081,065 filed Aug. 3, 1987, for "Removing Fines from Mass Resins."

FIELD OF THE INVENTION

The present invention relates to normal-sized mass polyvinyl chloride (PVC) resins or copolymers thereof in particle form essentially free from fine-sized particles, to fine-sized mass PVC particles which can be utilized as a blending resin, and to a process for separating the fines from mass produced PVC resins.

BACKGROUND OF THE INVENTION

Heretofore, mass PVC resin, or polymers thereof, that is resin produced in the absence of any emulsifiers or solvents contained a distribution of PVC particles, that is generally a distribution of so called "normal-sized" particles typically ranging in size from about 75 microns to about 425 microns and approximately from 1% or 2% to about 10% by weight of so called "fine-sized" particles smaller than 75 microns and usually smaller than 45 microns. Heretofore, separation of such fine particles from the produced resin blend was not known. Conventional techniques such as screening were unsuitable since the screens clogged. Static electricity build up in the fines also created separation problems.

U.S. Pat. No. 3,522,227 to Thomas, et al, relates to the production of mass PVC resins.

U.S. Pat. No. 4,198,376 to Francis Fournel, et al, relates to a vertical autoclave for producing mass PVC resin.

U.S. Pat. No. 4,257,880 to Jones relates to a centrifugal air classifying apparatus.

SUMMARY OF THE INVENTION

It is therefore an aspect of the present invention to provide fine free mass produced PVC resin or copolymers thereof in particulate form as well as fine-sized mass produced PVC resin or copolymers thereof in particulate form. The fine free resin mass PVC resin particles have a very high VCM (vinyl chloride monomer) desorption rate whereas the particulate fine-sized mass PVC resin is glassy and has a low VCM desorption rate. The particulate fine-sized resin can be utilized as a blending resin with a PVC dispersion resin to produce plastisols and as a sintering resin, a drying resin or an antiblocking additive for PVC resins. A process for producing the fine-sized particulate resin from mass produced PVC resin utilizes an air classifier. These and other aspects of the present invention will become apparent from the following detailed specification.

DETAILED DESCRIPTION OF THE INVENTION

Mass produced polyvinyl chloride resin is defined as resin which is generally produced without the use of any emulsifiers, surfactants, suspending agents, solvents, and the like, and thus is generally polymerized by itself under agitation. Polymerization is generally carried out in two stages. In the first stage, the vinyl chloride monomer and a free radical catalyst are raised to reaction temperatures under strong agitation. As polymerization is initiated, the polymer chains agglomerate and form small particles of approximately 0.1 microns. As polymerization continues, the small particles grow with the addition of more polymer thereto. Polymerization is carried out to about 7-15% of completion whereupon distinct particles are formed. The liquid is then transferred to another reactor for the second stage. The agitation in the second stage is much slower and the reaction vessel such as a ribbon blender can either be horizontal or vertical. The particles are allowed to grow to generally a nominal particle size of approximately 100 microns at about 60 to about 85% conversion. As conversion proceeds, the particles tend to be uniform in size, that is generally spherical. Inasmuch as the polymerization proceeds without surfactants or suspending agents, the materials are generally pure and do not have a skin or pericellular membrane caused by absorption of the surfactant or suspending agent.

The production of mass produced PVC resin is generally known to the art as well as to the literature. For example, U.S. Pat. No. 3,522,227 to Thomas relates to the production of mass PVC resin as in a horizontal blender and is hereby fully incorporated by reference with regard to all aspects thereof including the production of mass PVC resin containing less extremely large and extremely fine-sized particles and a greater amount of so called "normal-sized" particles. Similarly, U.S. Pat. No. 4,198,376 to Fournel, et al, also relates to the production of mass PVC resin utilizing a suitable vertical autoclave and is hereby fully incorporated by reference with regard to all aspects thereof including the use of an agitator in the form of a helicoidal ribbon about a rotatable shaft passing through the upper portion of the autoclave as well as an agitator comprising a rotatable shaft passing through the bottom portion of the autoclave, and the like.

Although mass produced PVC resin has been known as evidenced by the above patents, the resin has always contained a significant percentage of fine-sized resin, that is resin smaller in size, e.g. diameter, than 75 microns. In other words, generally inherent within the production of mass PVC resin is the generation of two separate and distinct particle sizes, that is a large majority of "normal-sized" particles as from about 75 to about 425 microns and a much smaller amount of "fine-sized" particles as from about 5 microns to about 45 microns. The amount of such fine-sized resin generally produced varies from about 1% or 2% up to about 10% by weight based upon the total weight of the mass PVC resin. Although various production methods can shift the number of so called "fine-sized" particles, the change is rather small. Physical separation such as screening also has not been successful due to static electric problems and plugging of the screens with the fine-sized resin. Plugging of the screens also limits the production capacity of any process.

When mass PVC resin is produced, approximately 3% to about 7% by weight is oversized resin, i.e. greater than 425 microns, from about about 83% to about 95% by weight is so-called "normal-sized" PVC particles having sizes greater than 75 microns up to about 425 microns, and from about 1% or 2% to about 10% by weight is "fine-sized" resins having particles smaller than 75 microns. The oversized is discarded. The remaining resin is feed resin, that is, resin which is fed to the air classifier. Thus, inherent within the production of such mass resin, as noted above, is the production of "fine-sized" resin having a particle size generally less than 75 microns. In this Specification, whenever reference is made to a particle size, it is obtained by utilizing an Alpine American Corporation Air Jet Seive model no. 200, and such a procedure or test is known to the art and to the industry. Although normal-sized and fine-sized resins are produced, both are free of a pericellar membrane.

It is to be understood that although an air classifier is utilized to separate or remove the fines therefrom, the air classifier is generally utilized in conjunction with a normal screening process. Such screening processes are known to the art and to the literature and hence will not be set forth. Rather it is noted that a mass produced PVC resin is separated by screens up until the size of approximately 425 microns. Of course, other size screens can be utilized. Particles passing through such screens are then fed to the air classifier.

It is also to be understood that wherever the term "PVC" or "PVC" resin is utilized, it is to include the various copolymers thereof. That is, the vinyl chloride monomers can be polymerized in the presence of additional comonomers such as vinyl halides, or vinylidene halides, for example vinyl bromide, vinylidene chloride, etc.; vinylidene monomers having at least one terminal $CH=C<$ group such as esters of acrylic acid, for example methyl acrylate, ethyl acrylate, butyl acrylate, octyl acrylate, cyanoethyl acrylate, and the like; vinyl acetate; esters of methacrylic acid such as methacrylate, butyl methacrylate, and the like; styrene and styrene derivatives including alpha-methyl styrene, vinyl toluene, chlorostyrene; vinyl naphthalene; diolefins including butadiene, isoprene, chloroprene, and the like, as well as other types of comonomers known to the art and to the literature.

According to the concepts of the present invention, two separate and distinct particulate mass PVC resins or products are produced. That is, a process is provided wherein fines are substantially removed from the above-noted mass produced PVC resin. A desired method of the removal of the fines is through the utilization of air classifiers. That is, various air classifiers are utilized wherein the fine-sized particles are separated and removed from the normal-sized particles by different air streams. That is, light particles are carried by one air stream in one direction whereas heavier particles are carried by another stream in a different direction. Thus, air classifiers are different than cyclones wherein separation of dense particles is through centrifugal force and usually through a perimeter screening system. Suitable air classifiers are also of a type which can handle acceptable production rates on a "once through" basis. That is, recycling of the normal size PVC resin particles is not necessary.

Air classifiers can generally be defined as an apparatus in which the major operating parameters are rotor RPM, air flow, and feed rate. Particles are generally carried to the rotor by a drag force that is exerted by the air flow. Normal-sized particles (i.e. 75 to 425 microns) are repelled by centrifugal force from the rotating rotor. Particles of predetermined fineness (i.e. less than 75 microns) pass between the rotor blades and are carried with an air flow to a product collector (e.g. a cyclone) or the like. The normal-sized particles are discharged by the separator. Although various types of classifiers can be utilized such as those manufactured by Husokawa, Air Shifter and the like, a preferred type of classifier is one which has a high amount of air circulation, a tapered rotor blade configuration, and a gravity feed into the rotor area of the classifier.

More specifically, the present invention relates to a centrifugal type air classifying system capable of achieving separation or classification of various small sizes as for example 75 microns or less by providing a main classifying chamber with a vertical blade rotary rejector, associated with a lower classifying or expansion chamber and return air, and a fine particle collector cyclone or bag house, incorporated in an air duct and fan loop including a fan to supply transport and particle suspension air for the classifying of the fines. The cut point or upper limit of particle size classified by the system is variable by increasing or decreasing the speed of the vertical blade rotary rejector. The material to be classified is delivered to the main or upper classifying chamber so that the material "floats or swims" to the classifying chamber in a fluffy or dispersed state, and a tapered blade configuration is provided for the vertical blade rotary rejector. The blade configuration provides varying tip speed which is highest at the top of the vertical blade rotary rejector, causing more air to flow at the top of the main classifying chamber giving better dispersion, and allowing the bottom portion of the vertical blade rotary rejector to recover a higher percentage of the so called normal-sized material entering the classifying chamber.

Such an air classifier is basically set forth in U.S. Pat. No. 4,257,880 which is hereby fully incorporated by reference with regard to all aspects thereof. It is further noted that the air classifier contains a cyclone in association therewith to collect the fines removed from the rotor portion of the air classifier. An example of such a commercially available air classifier is a Micro Sizer MS-5, manufactured by Amvest Progressive Industries.

The utilization of an air classifier thus produces two products of distinct size PVC resins in one step, that is the fine-sized resin or blending resin and the normal-sized resin. It is an important aspect of the present invention in order to achieve a high throughput capacity that the generally standard or conventional air classifiers have an enlarged outlet of the main classifier chamber and have an antivortex baffle thereon. By enlarging the main classifier chamber outlet, as for example an increase in diameter of about 25% to about 75%, an increase in capacity of at least 100% is readily achieved.

The fines separated by the air classifier, as noted, generally have a particle size of 75 microns or less, that is such fines generally pass through a 200 U.S. standard mesh screen. Inasmuch as 75 microns has been set as an arbitrary value and inasmuch as the air classifier can be adjusted to separate fines of a smaller or larger size, it is to be understood that the particle size of the mass fine-sized resin can be 55 or 65 microns or less, 80 or 85 microns or less, and the like. As noted above, inasmuch as two separate and distinct particle sizes exist, the exact separation point between normal-sized resin and fine-sized resin is not important. Generally, the particle size separated out, that is the cut achieved by the air separator, is generally governed by the air flow rate, rotor RPM, and feed rate. In the above-noted Micro Sizer MS-5, for a 75 micron size cut, the air flow fan RPM was increased to approximately 3,900 RPM and the outlet of the main classifier chamber was enlarged to 18 inches.

The amount of fines obtained is an effective amount such that the normal-sized resin is substantially fine-free and such amount depends upon the operating conditions of the air classifier. Generally, the fine-sized PVC resin collected or separated out by the air classifier has at least 80% or 90% by weight, desirably at least 95% by weight, more desirably at least 98% by weight, preferably at least 99% by weight, and more preferably at least 99.9% by weight of particles having a size of 75 microns or less. Although the cut was arbitrarily set at approximately 75 microns, in reality, the mass PVC resin fines are generally much smaller in size. For example, at least 80% by weight and desirably at least 90% by weight of the fines are smaller than 45 microns, and typically at least 50% by weight, and at least 60% by weight are smaller than 20 microns. A characteristic of the fines is that they tend to be glassy, that is non porous or solid. The glassy fines, therefore, tend to contain vinyl chloride monomer trapped therein. VCM desorption values therefore tend to be high. When subjected to a helium carrier gas at 90° C. for 1 minute, the vinyl chloride monomer content of the fines was approximately 10 parts per million as compared to an average value of approximately 4 parts per million of the feed material, that is the PVC resin fed to the classifier. Generally, the VCM desorption values of the fines are at least 150% greater, generally 200% greater, and often at least 250% greater than a VCM desorption value of the normal-sized material. The difference of the VCM desorption values is much greater as the time of stripping is increased since the vinyl chloride monomer tends to be tied up in the glassy fine particles whereas it is readily stripped from the normal-sized PVC resin particles.

The fines obtained by the present invention constitute a unique blending resin often having a particle size of less than 20 microns which was heretofore not commercially available. That is, the fine-sized polyvinyl chloride resin or copolymers thereof of the present invention which are free of emulsifiers, soaps, colloids, etc., can be utilized as a filler or in association with a dispersion resin thereby constituting a new source of a blending resin to form a plastisol. In other words, the fines obtained by the present invention (free of a pericellar membrane) are unique in that they are not available through any other polymerization technique. The size of the fine mass PVC particles is generally from about 1 to about 75 microns, desirably from about 3 to about 60 microns, more desirably from about 5 to about 45 microns, and preferably from about 10 to about 20 microns in size. Hence, such fines when utilized as a blending resin in association with a dispersion resin as well as optional plasticizers and compounding aids form a unique plastisol since a conventional mass extender resins generally have larger particle sizes and a more porous morphology.

The paste dispersion resin utilized in the forming of plastisol is a conventional resin which is well known to the art and to the literature and can contain conventional amounts of plasticizing agents, compounding agents, processing aids, and the like, known to the art and to the literature. Generally, a dispersion resin is made with emulsifiers as well as suspending agents. The primary particle size of such dispersion resins are generally small as from about 0.2 to about 2.0 microns although other sizes can also be utilized as known to the art and to the literature. Desirably, fine mass PVC resin particles of from about 10 or 15 to about 20 microns are utilized with the dispersion resin to produce plastisols. The amount of fine mass PVC resin particles utilized as a blending resin is generally from about 5% to about 50% by weight, desirably from about 10% to about 40% by weight, per 100 parts by weight of the fines and the PVC dispersion resin. Hence, the amount of the dispersion is the difference. The advantages of producing a plastisol with the fine mass PVC resin of the present invention are a plastisol having a slow settling rate, having low streaking properties and can thus be utilized in thin films, and have controlled rheology. The fine mass resin particles can also be used as a drying additive to improve the flow of highly plasticized PVC dry blends and as a sintering resin for battery separator applications.

The normal size mass PVC resin in particulate form, that is fine free resin, obtained from an air classifier in accordance with the present invention generally has an effective amount of fine-sized resin particles removed therefrom such as at least 25%, desirably at least 50%, more desirably at least 80%, usually at least 90%, preferably at least 95%, and more preferably at least 98% by weight so that improved properties such as increased bulk density and reduced funnel flow time are obtained. Inasmuch as these PVC resin particles are produced by a mass polymerization process, they are free from or lack a pericellular membrane. The amount of normal-sized resin obtained according to the air classifier process or utilization thereof, according to the present invention having a particle size of greater than 75 microns to about 425 microns, is usually at least 95% by weight, desirably at least 98.5% or 99.0% by weight and preferably at least 99.5% by weight. Considering the amount of dust-free particles, that is particles generally larger than 45 microns in size and hence from about 45 to about 425 microns, the amount of such size resin obtained by the present invention is at least 97% by weight, desirably at least 99.5% by weight, and often times at least 99.9% by weight. Typically, the bulk, that is at least 80% of the normal-sized particles range in size from about 80 to about 250 microns, and at least 60% by weight of the normal-sized particles range in size from about 80 to about 180 microns. Such fine free PVC mass resin particles are highly desirable in that they generally have favorable properties. For example, the apparent bulk density is usually higher. That is, the bulk density of the normal-sized mass PVC resin is increased by at least 1.5%, desirably by at least 4.0% and preferably by at least 7.0%. The test for determining apparent bulk density is set forth in ASTM D-1895-69. Another important advantage of the separated normal size mass PVC resin particles is that the flow thereof is improved. In accordance with a standard funnel flow test, as set forth in ASTM D-1895-69, the flow time is improved, that is the flow time is reduced by at least 5%, desirably by at least 14%, and preferably by at least 20%. The improved properties with regard to both the apparent bulk density and the reduced flow time are in comparison with the feed resin, that is the mass PVC resin feed to the air classifier. Such flow enhancing properties are highly desirable in various processing operations such as extrusion, injection molding, and the like. The stability of the normal-sized PVC resin of the present invention is improved inasmuch as glassy particles, that is fines, have been separated therefrom. The resulting normal-sized mass PVC resin particles hence contain a low amount of residual vinyl chloride monomer therein which imparts improved stability thereto. Inasmuch as the glassy particles are removed or eliminated from the normal-sized mass polyvinyl chloride resin, the amount of fisheyes or gel sites are reduced. Normally the reduction is quite dramatic as an approximate average reduction of from about 40 gel sites in the feed resin to the classifier to approximately 10 or less in the normal-sized PVC resin. The determination was made according to a 6 minute Benner fisheye test, known to the industry and to the art. Of course, depending upon the particular formulation and the classifier parameters, other values can be obtained. However, it is generally noted that a large reduction of the above magnitude is usually obtained.

Of course, probably the most notable improvement or property of the fine free mass PVC resin particles of the present invention is that dusting is eliminated. That is, in ensuing processes such as blending, conveying, mixing, and the like, the creation of dust is essentially eliminated.

The normal-sized mass PVC resin of the present invention can be utilized wherever heretofore mass PVC resin has been utilized. Typical applications include sheets, bags, bottles, plastic pipes, pipe fittings, vinyl sidings, rigid PVC resin food packaging, and the like.

This aspect is important in that it permits the normal mass PVC resin particles to be utilized in making various plastic bottles with regard to various food and drug items, as for example edible oils, peanut butter, blood bags, and the like.

The invention will be better understood by reference to the following examples:

EXAMPLE I

Mass PVC resin was produced in a manner as set forth in U.S. Pat. No. 3,522,227 which is hereby fully incorporated by reference. The formulation of the mass resin was as follows:

| Material | Units | Amount |
|---|---|---|
| PREPOLY (AN EIGHT CUBIC METER VESSEL) | | |
| Vinyl chloride | lbs. | 12,500 +/− 500 |
| SBP, Secondary Butyperoxy dicarbonate | lbs. | 1.9 +/− 0.2 |
| Mineral spirits | lbs. | 8.5 +/− 2.0 |
| Epoxy Soya solution | mls. | 75 +/− 25 |
| Nitric acid solution | mls. | 70 +/− 30 |
| AUTOCLAVE (A SIXTEEN CUBIC METER VESSEL) | | |
| Vinyl Chloride | lbs. | 8,000 +/− 1,000 |
| SBP, Secondary Butyperoxy dicarbonate | lbs. | 2.2 +/− 0.3 |
| Mineral Spirits | lbs. | 8.0 +/− 2.0 |
| Irganox 1076 | lbs. | 1.0 +/− 0.5 |
| Nitric acid solution | mls. | 225 +/− 100 |
| Lauryl peroxide | lbs. | 9.5 +/− 1.0 |

Remarks

Generally, the various prepoly compounds were added at the same time to a reactor and reacted at 56° C.-80° C. for approximately ½ hour. The resultant mass was then transferred to the autoclave whereupon it was reacted at approximately 50° C.-80° C. for about 3 hours. The epoxy soya solution is a mixture of 1 part epoxy soya and 3 parts xylene blend. The xylene blend is used as a diluent which will thin the epoxy soya to a workable viscosity. Nitric acid solution is a mixture of 1 part nitric acid, 42 Baume and 2 parts distilled water. The distilled water is used as a diluent which allows the nitric acid to be handled more safely.

The mass produced resin set forth above was subjected to an air classifier of the type set forth in U.S. Pat. No. 4,257,880 which is hereby fully incorporated by reference. More specifically, an Amvest Progressive Industry Micro Sizer MS-5 was utilized. The Micro Sizer was altered by enlarging the outlet diameter of the main classifier from 8 inches to 10 inches and installing an antivortex baffle therein. The fan RPM of the classifier was 3,900 whereas the rotor RPM was approximately 900. The resin feed rate was governed by the rotary valve RPM which was from about 12 to about 18. An integral part of the Micro Sizer MS-5 was a cyclone which collected the fine-sized mass PVC resin. With the above operating conditions and parameters, a once through pass of the feed resin was made.

A comparison of the mass PVC resin fed to the classifier and that obtained from the classifier is set forth in Table I.

TABLE I

| RESIN | % <45 Microns | % <75 Microns | ABD* g/cc | FFT** (sec) | Brenner 6 min Fisheyes |
|---|---|---|---|---|---|
| Separated mass PVC resin out of classifier | 0.3 | 1.7 | .584 | 19.9 | 9 |
| mass PVC resin fed to classifier | 3.7 | 4.1 | .576 | 21.7 | 39 |

*Apparent bulk density (ASTM D-1895-69)
**Funnel Flow Time (ASTM D-1895-69)

As apparent from Table I, the amount of fines in the normal resin was drastically reduced. The apparent bulk density as well as the funnel flow rates were improved and the amount of fisheyes in the resin was reduced.

Numerous other experiments have been made wherein the mass formulation was somewhat changed and operating conditions, i.e. rotor PPM, fan RPM, and rotary valve PPM (feed rate) were varied. However, the above results of reduced fisheyes and funnel flow time as well as increased apparent bulk density were obtained. Moreover, a substantial amount of the fines was readily separated out. Data was thus obtained as set forth throughout the Specification.

EXAMPLE 2

To demonstrate low settling properties, a vinyl plastisol was prepared by mixing 50 parts of Geon 121 vinyl dispersion resin, 50 parts of Geon 221 blending resin, and 90 parts of DOP in a Hobart mixer. The plastisol was then deaerated and put into a clear glass pint jar. The jar was observed for resin separation or settling at intervals of 3, 4, 5, 6, and 7 days by inserting a spatula in the plastisol. The experiment was repeated where Geon 221 was substituted by fine particle size (average particles 17 microns) mass PVC resin. As shown in Table 1, the plastisol made with conventional blending resin Geon 221 showed settling within 4 days, while plastisol made with fine particle size mass PVC showed no settling after 7 days.

TABLE II

| | A | B |
|---|---|---|
| Geon 121 Dispersion Resin | 50 | 50 |
| Geon 221 Blending Resin | 50 | — |
| Fine Particle Size Mass PVC (Avg. Particle Size 17 Microns) | — | 50 |
| DOP 90 | 90 | 90 |
| SETTLING OR SEPARATION | | |
| 3 Days | No settling | No settling |
| 4 Days | Light settling | No settling |
| 5 Days | Moderate settling | No settling |

TABLE II-continued

|  | A | B |
|---|---|---|
| 6 Days | Heavy settling | No settling |
| 7 Days | Heavy settling | No settling |

EXAMPLE III

To show the utility of fine particle size mass PVC blending resin in very thin film coating application, plastisols were prepared using a blend of a dispersion resin and a standard blending resin with average particle size of 25 to 30 microns, and substituting the standard blending resin with fine particle mass PVC blending resin with average particle size of 17 microns. The plastisols were deaerated and coated with varying thicknesses of plastisols from 1 to 10 mils and cured for five minutes at 350° F. in a forced air oven. The cured films were visually observed for streaks and compared for smoothness by rubbing the fingers over the film.

As shown in Table II, the standard blending resin at 1-2 mil coating afforded heavy scratches and the surface texture of the film was very rough all the way up to 5 mils. The fine particle size mass resin gave very smooth film and very few scratches at 1 mil and for thicknesses higher than 1 mil there were no scratches and the films were extremely smooth.

TABLE III

|  | A | B |
|---|---|---|
| Geon 178 Dispersion Resin | 70 | 70 |
| Geon 217 Blending Resin (25-30 Microns) | 30 | — |
| Fine particle Mass Blending Resin (17 Microns) | — | 30 |
| DOP | 57 | 57 |
| Epoxy Soya Oil | 3 | 3 |
| Stabilizer | 2 | 2 |

FILM QUALITY (350° F./5 MIN)

| | SCRATCHES | | SURFACE TEXTURE | |
|---|---|---|---|---|
| | A | B | A | B |
| 1 Mil | Heavy | Slight | Rough | Smooth |
| 2 Mil | Moderate | No | Rough | Smooth |
| 3 Mil | No | No | Rough | Smooth |
| 5 Mil | No | No | Rough | Smooth |
| 7 Mil | No | No | Smooth | Smooth |
| 9 Mil | No | No | Smooth | Smooth |

EXAMPLE IV

This example demonstrates the utility of fine particle size mass blending resin as a drying resin. When a standard plasticized powder compound is prepared using a large particle size mass resin for various powder coating applications, a very fine particle size dispersion resin is added at the end of the compounding cycle to promote good flow. The average particle size of the dispersion resin used is around 1 to 2 microns. The standard blending resins cannot be replaced with dispersion resin because the particle size is too large, they are very inefficient and even at low levels they provide poor fusion, resulting in rough surface.

As shown in Table III, a dry blend compound was produced in the high speed Henschel mixer and at the end of the compound preparation, 6 parts of Geon 125 dispersion resin was added as a drying resin. In another mix, the same compound was prepared in a high speed mixer, keeping all the conditions constant. This time 6 parts of Geon 125 was substituted by 9 parts of fine particle mass PVC resin. The additional drying resin was used to compensate for the particle size difference between Geon 125A and the fine particle blending resin. The dry powder was then pressed into 0.100" mold at 450° F. for 5 minutes under pressure. The resulting films were observed for smoothness and were evaluated for tensile and elongation. For all practical purposes, the two films provided equivalent surface and tensile and elongation properties.

TABLE IV

| Geon 143 | 100 | 100 |
|---|---|---|
| DIDP | 45 | 45 |
| Epoxy Soya Oil | 5 | 5 |
| Mark 180 Stabilizer | 4 | 4 |
| Drying Resins | | |
| Geon 125 | 6 | — |
| Fine Particle Mass Resin | — | 9 |
| Films (0.100") | | |
| 450 F/5 Min. | Smooth | Smooth |
| Mechanical Properties (450 F/5 Min) | | |
| Tensile, PSI | 1950 | 2000 |
| % Elongation at Break | 180 | 180 |

While in accordance with the patent statutes, a best mode and preferred embodiment has been set forth in detail, the scope of the invention is not limited thereto but rather by the scope of the attached claims.

What is claimed is:

1. A particulate mass PVC resin substantially free of fines, consisting essentially of:
   mass produced air classified surfactant-free normal-sized PVC resin particles having a particle size of generally greater than 75 microns, wherein the amount of said mass produced air classified normal-sized PVC particles having said particle size of at least 75 microns is greater than 99.0 percent by weight, with said mass produced air classified normal-sized PVC resin particles being free of a pericellular membrane.

2. A particulate mass PVC resin substantially free of fines according to claim 1, wherein the particle size of said normal-sized particles is at least 75 microns to about 425 microns.

3. A particulate mass PVC resin substantially free of fines according to claim 2, wherein the amount of said normal-sized particles is at least 99.5 percent by weight.

4. A particulate mass PVC resin substantially free of fines according to claim 2, wherein said mass PVC resin particles have a funnel flow time reduction of at least 7.5% in comparison to said preclassified mass PVC resin particles.

5. A particulate mass PVC resin substantially free of fines according to claim 2, wherein said mass PVC resin particles have an apparent bulk density increase of at least 1.5% in comparison to said preclassified mass PVC resin particles.

6. A particulate meas PVC resin substantially free of fines according to claim 2, wherein said mass PVC resin particles have an apparent bulk density increase of at least 4.0% in comparison to said preclassified mass PVC resin particles.

7. A particulate mass PVC resin substantially free of fines according to claim 3, wherein said mass PCV resin particles have an apparent bulk density increase of at least 7.0% in comparison to said preclassified mass PVC resin particles.

* * * * *